2 Sheets—Sheet 1.
J. POTTS.
Cultivator.
No. 62,223
Patented Feb. 19, 1867.
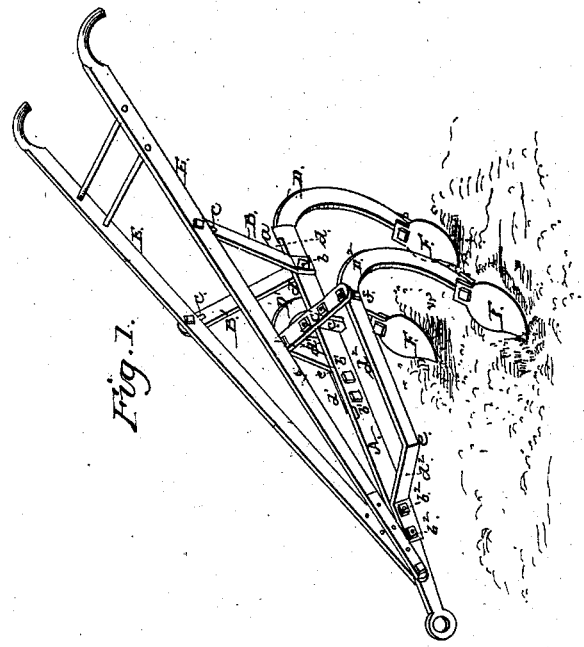
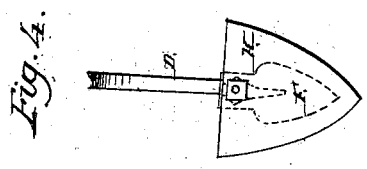
Witnesses:
Clarence Ridgely
John C. Parker
Inventor:
Jonas Potts
N. PETERS, PHOTO-LITHOGRAPHER, WASHINGTON, D. C.

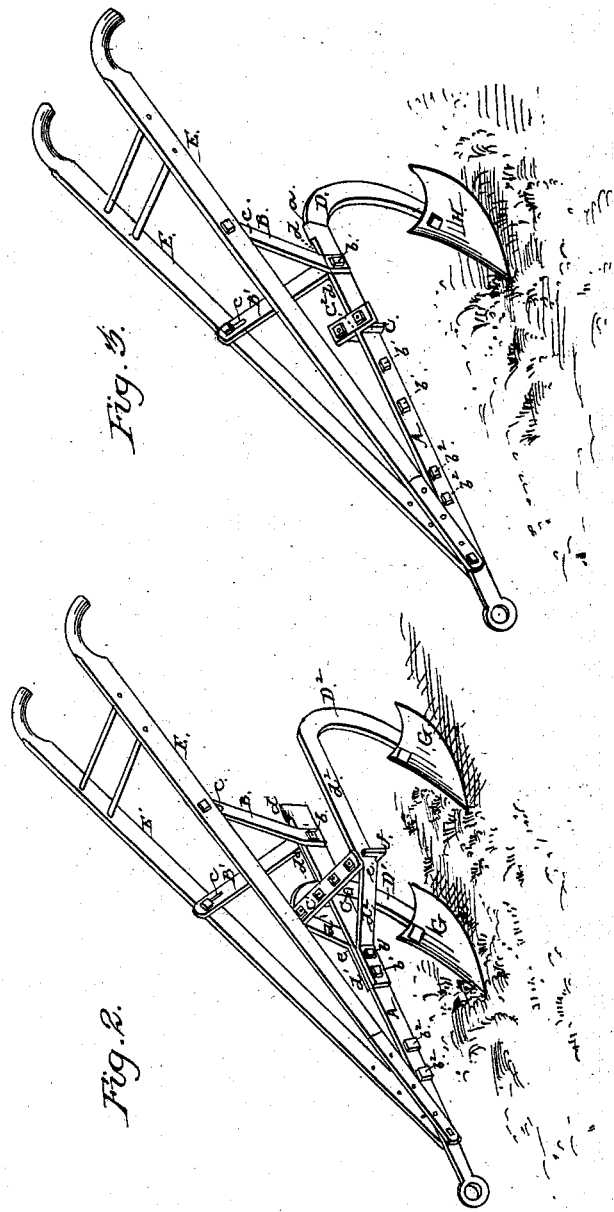

United States Patent Office.

JONAS POTTS, OF BRIDGEPORT, WEST VIRGINIA.

*Letters Patent No. 62,223, dated February 19, 1867.*

---

IMPROVEMENT IN CULTIVATORS.

---

𝕿𝖍𝖊 𝕾𝖈𝖍𝖊𝖉𝖚𝖑𝖊 𝖗𝖊𝖋𝖊𝖗𝖗𝖊𝖉 𝖙𝖔 𝖎𝖓 𝖙𝖍𝖊𝖘𝖊 𝕷𝖊𝖙𝖙𝖊𝖗𝖘 𝕻𝖆𝖙𝖊𝖓𝖙 𝖆𝖓𝖉 𝖒𝖆𝖐𝖎𝖓𝖌 𝖕𝖆𝖗𝖙 𝖔𝖋 𝖙𝖍𝖊 𝖘𝖆𝖒𝖊.

---

TO ALL WHOM IT MAY CONCERN:

Be it known that I, JONAS POTTS, of Bridgeport, in the county of Harrison, and State of West Virginia, have made new and useful improvements in Cultivators; and I do hereby declare the following to be a full and exact description of the same, reference being had to the accompanying drawings, making part of this specification, and in which—

Figure 1 is a perspective view of my improvement when used as a cultivator.

Figure 2 is a perspective view of the same when used as a double-shovel plough.

Figure 3 is a perspective view of the same, when used as a single-shovel plough; and Figure 4 shows the manner in which the plough shovel is changed on the standard for a cultivator shovel.

Similar letters of reference indicate corresponding parts in the several figures.

The nature of my invention consists in providing a cultivator which can be changed into a double or single-shovel plough by merely changing the position of the uprights, and by substituting larger for smaller shovels on the same.

To enable others skilled in the art to which my invention appertains to fully understand and use the same, I will proceed to describe its construction and operation.

In the drawings, A represents the plough-beam made of wrought iron, extending to a little distance back of the standards B $B^1$, tapering in thickness from the yoke C back to its end, on which there is a little projection, $a$, in hook form, which catches over the arm $d$ of the upright D. This arm $d$ also tapers in thickness towards its forward end, and is firmly held to the plough-beam A, by means of the yoke C, a bolt, $b$, passing through the standards B $B^1$, the beam A and arm $d$, and by the projection $a$ on the beam. As an additional security a bolt, hid from view in the drawings by the yoke C, passes through the beam A and arm $d$ just in the rear of the yoke. The standards B $B^1$ are provided with slots, $c$, at their upper ends, and the handles E are fastened to the same by bolts passing through the slots and held by nuts, so that the handles may be set to suit the size of the person using the cultivator. The handles are fastened at their forward ends to the beam A by means of a bolt, as shown in the drawings. $D^1$ and $D^2$ are uprights on the right and left side, respectively, of the beam, the arms $d^1$ and $d^2$ of which extend forward and are bent at $e$ to keep the shovels attached to their uprights at a proper distance from the line of work of the shovel on the upright D, and from each other. The upright $D^1$ is secured to the beam A by bolts $b^1$ $b^1$, and the upright $D^2$ by bolts $b^2$ $b^2$, and their arms $d^1$ $d^2$ are held in hooks, $f$, fastened in the plate $C^1$ of the yoke C by means of bolts, the plate being held on the yoke by nuts also. The cultivator shovels F are fastened to the uprights $D^1$ $D^2$ D by means of bolts at their upper ends, the ends of the uprights tapering, as shown in dotted lines in fig. 4, to a point, which is slightly bent forward, and catches in a small hole in the back of the shovels. It is not essential, however, to taper the end of the uprights, as the same can be spread and provided with a projection to catch into the hole in the back of the shovel, the spread part being a support for the same. In fig. 2 the manner of converting the cultivator into a double-shovel plough is shown. The bolts $b^2$ $b^2$ being unscrewed, the arm $d^2$ is pushed back until it can be fastened by the same bolts that hold the arm $d^1$. The bolt $b$ being withdrawn, as well as the bolt in the rear of the yoke, which latter is also taken off, the upright D is then removed, and in place of the arm $d$ a piece of wood, $d^3$, made in the same form and shape, is placed in its stead, and the yoke and bolts replaced. The piece $d^3$ enables the yoke and the bolts to hold the beam A securely and firmly. The cultivator shovels, F, are changed for plough shovels, G, and the double-shovel plough is ready for use. In fig. 3 I show my improved cultivator transformed into a single-shovel plough. In this case both uprights $D^1$ and $D^2$ are removed, and the cultivator shovel changed for a single-plough shovel, H, which is larger than the shovels G, in fig. 2. When the single-shovel plough is used, the yoke bar $C^1$ may, if desired, be changed for a small bar of wood, $C^2$, as there is no strain on the same as in the cultivator or double-shovel plough, in which it has to support the arms $d^1$ $d^2$ of the uprights $D^1$ $D^2$. In changing the cultivator to the ploughs, the bolts not in use may be left on the beam, so as to be ready for the next change, and to prevent their loss.

Farmers have use for and use each of the three kinds of ploughs described, though they can cultivate their ground with a single-shovel plough; but it takes a great deal more labor and time as when they employ all three kinds, each at the season when it has its separate task to perform. My improvement places it in the reach of every farmer to have the three implements in one, at a cost not exceeding that of either two of the three, made separately. It is easily changed, simple in its construction, and as strong and durable as any cultivator or plough. At each transformation not only the shovels, but also the position of the arms, are changed, as in changing from a cultivator to a double-shovel plough the upright $D^2$ is placed back so as to throw its shovel G behind that of the upright $D^1$.

Having thus described my invention, what I claim as new therein, and desire to secure by Letters Patent, is—

1. A cultivator provided with movable uprights D $D^1$ $D^2$, and their arms $d$ $d^1$ $d^2$, to enable it to be changed to a double or single-shovel plough, substantially as and for the purposes described.

2. The yoke C, provided with a plate $C^1$, having hooks, $f$, fastened to it to hold and support the arms $d^1$ and $d^2$, substantially as described.

3. The plough-beam A, provided with a projection $a$, and tapering at its end, substantially as and for the purpose set forth.

4. The combination of the plough-beam A, projection $a$, yoke C, plate $C^1$, hooks $f$, uprights D $D^1$ $D^2$, with their arms $d$ $d^1$ $d^2$, substantially as and for the purposes described.

JONAS POTTS.

Witnesses:
    CLARENCE RIDGELY,
    JOHN C. PARKER.